Sept. 15, 1964
C. P. JASPER ETAL
3,148,895
HOSE CONNECTORS FOR VACUUM CLEANERS
Filed July 7, 1960
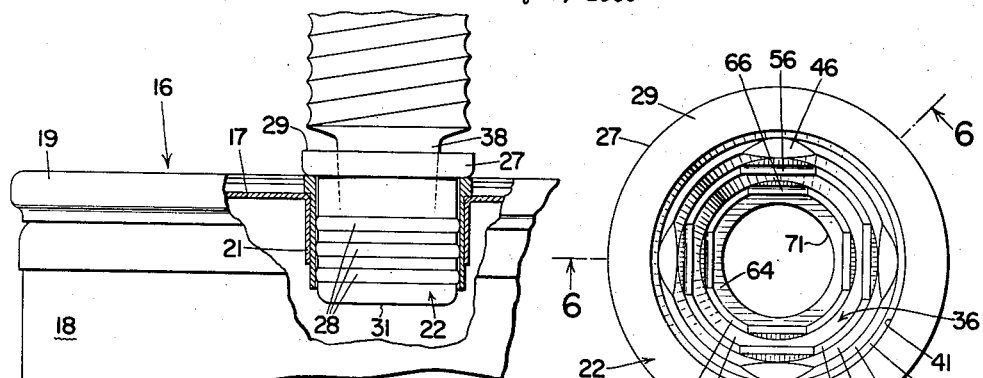
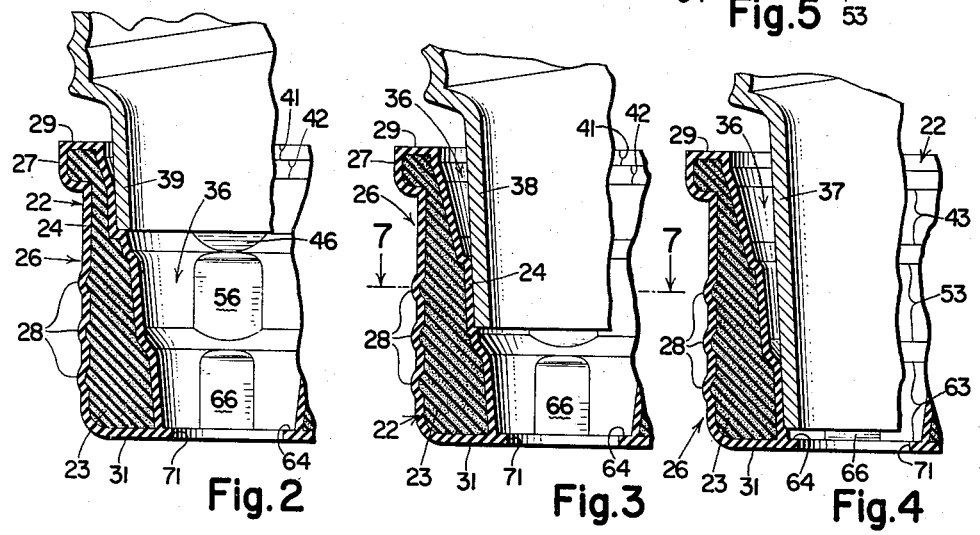
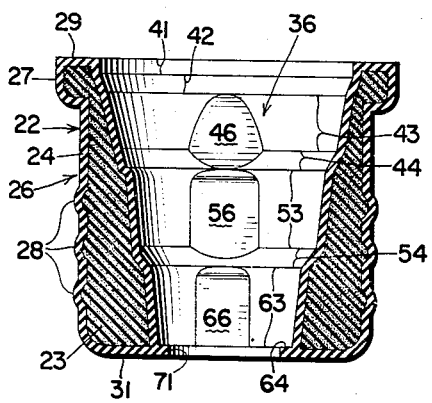
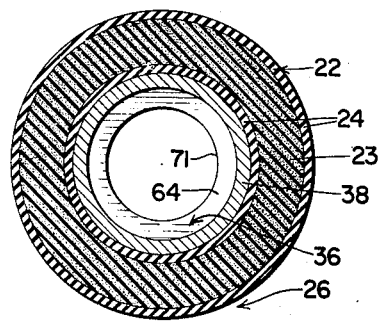
WITNESS
William Martin
INVENTORS
Charles P. Jasper
Kenneth Perkins
BY Marshall J. Breen
ATTORNEY

United States Patent Office 3,148,895
Patented Sept. 15, 1964

3,148,895
HOSE CONNECTORS FOR VACUUM CLEANERS
Charles P. Jasper, Nutley, and Kenneth Perkins, Scotch Plains, N.J., assignors to The Singer Company, a corporation of New Jersey
Filed July 7, 1960, Ser. No. 41,310
1 Claim. (Cl. 285—7)

This invention relates to vacuum cleaners and more particularly to an improved hose connector designed for use as part of a vacuum cleaner.

While the above connector of the present invention may have many different uses, it is primarily intended for use with the workshop dust collector or vacuum cleaner illustrated in United States design patent application Serial No. D. 56,077, now United States Design Patent No. D. 189,743, and the primary object of the present invention is to provide an improved hose connector for such use.

Another object of the invention is to provide an improved vacuum cleaner hose connector that is capable of accommodating a number of different sized metallic tubes of the type generally carried on the ends of a vacuum cleaner hose.

A still further object of the present invention is to provide an improved vacuum cleaner hose connector that will provide a leak-proof seal between a vacuum cleaner and a hose connected thereto.

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it when read in conjunction with the accompanying drawings in which:

FIG. 1 is a fragmentary elevational view, partly in section, showing a workshop dust collector or vacuum cleaner, equipped with a hose connector embodying the present invention, FIG. 2 is an enlarged fragmentary view showing the hose connector of the present invention accommodating the metallic end of a large sized hose, FIG. 3 is a view similar to FIG. 2 but showing the hose connector accommodating the metallic end of a medium sized hose, FIG. 4 is a view similar to FIGS. 2 and 3 but showing the hose connector accommodating the metallic end of a small hose, FIG. 5 is a top plan view of the hose connector of the present invention, FIG. 6 is a sectional view taken on the line 6—6 of FIG. 5, and FIG. 7 is a sectional view taken on the line 7—7 of FIG. 3.

The present invention is shown in the accompanying drawings as used with a vacuum cleaner 16 having a circular top cover 17 held to a cylindrical dirt receiving trash can 18 by a clamping ring 19. The cover 17 is formed with a depending cylindrical tube 21 into the inside of which is forced the hose connector 22 of the present invention.

The hose connector 22 is in the form of a short cylindrical tube, and the internal body portion 23 of the tube is formed of a soft squashy substance or material such as sponge rubber or vinyl foam. All inner and outer surfaces of the internal body portion 23 are covered with a smooth impervious vinyl coating 24. The outside 26 of the hose connector 22, which outside of course is covered with the vinyl coating 24, has an upper flange 27 and three spaced elevated rings 28—28—28. The rings 28 assure that the external outside 26 of the connector 22 will make a positive non-leaking contact with the internal surface of the metallic tube 21. The flange 27 determines the depth to which the connector 22 can be placed in the tube 21. The upper end of the connector 22 has a flat annular surface 29 and the lower end of the connector 22 has a flat annular surface 31. The inside 36 of the connector 22, which inner side 36 is also covered with the vinyl coating 24, has a shape and form especially adapted to accommodate a plurality of different sized metallic tubes, as, for example, a small sized metallic end or tube 37 (FIG. 4), a medium sized metallic end or tube 38 (FIG. 3), or a large sized end or metallic tube 39 (FIG. 2).

The inside 36, at a location adjacent to the surface 29, is formed with a cylindrical surface 41 forming a large mouth, the inside diameter of which is slightly larger than the outside diameter of the largest tube 39 that will be used. Adjacent to the surface 41, the inside 36 is formed with a frusto-conical surface 42, the largest circumference of the surface 42 being concyclic with one edge of the surface 41. Adjacent to the surface 42 the inside 36 is formed with a frusto-conical surface 43, the largest circumference of the surface 43 being concyclic with the smallest circumference of the surface 42. Adjacent to the surface 43 the inside 36 is formed with a frusto-conical surface 44, the largest circumference of the surface 44 being concyclic with the smallest circumference of the surface 43. At four separate locations spaced 90 degrees apart around the circumferences of the surfaces 43 and 44 there are placed four raised portions or bumps, these bumps being designated by the numeral 46. It will be noted that the bumps 46 extend all the way between the largest diameter of the surface 43 and the smallest diameter of the surface 44.

Adjacent to the surface 44, the inside 36 is formed with a frusto-conical surface 53, the largest circumference of the surface 53 being concyclic with the smallest circumference of the surface 44. Adjacent to the surface 53 the inside 36 is formed with a frusto-conical surface 54, the largest circumference of the surface 54 being concyclic with the smallest circumference of the surface 53. At four separate locations spaced 90 degrees apart around the circumferences of the surfaces 53 and 54, there are placed four raised portions or bumps, 56, it being noted that the bumps 56 do not extend all the way between the largest and the smallest diameters of the surface 54.

Adjacent to the surface 54, the inside 36 is formed with a frusto-conical surface 63, the largest circumference of the surface 63 being concyclic with the smallest circumference of the surface 54. Adjacent to the surface 63, the inside 36 is formed with a surface 64, the largest circumference of the surface 64 being concyclic with the smallest circumference of the surface 63. At four separate locations spaced 90 degrees apart around the circumferences of the surfaces 63 and 64, there are placed four raised portions or bumps 66, it being noted (FIG. 5) that the bumps 66 do not extend all the way between the largest and the smallest diameters of the surface 64.

Adjacent to the surface 64, the inside 36 is formed with a cylindrical surface 71 forming a small mouth, the smallest circumference of the surface 64 being concyclic with one edge of the surface 71.

The subject hose connector 22 functions in the following manner. If it should be desirable to connect a vacuum cleaner hose having the large sized tube 39 (FIG. 2) connected to one end thereof, the tube 39 is guided into engagement with the frusto-conical surface 43 by the two surfaces 41 and 42, and as best seen in FIG. 2 the tube 39, when forced into the opening defined by the surface 43, depresses that surface and the four bumps 46 until the tube 39 makes an air tight connection with the vacuum cleaner 16. The bumps 46, when depressed by the tube 39, cause the portions of the connector 22 circumferentially between the bumps 46 to increase their grip on the tube 39. In like manner, the frusto-conical surface 53 and its bumps 56 grip the medium sized tube 38 (FIG. 3) and the frusto-conical surface 63 and its bumps 66 grip the small sized tube (FIG. 4) 37. In each, of the latter cases the bumps 56 and 66, when depressed, cause the portions of the connector 22 circumferentially between the bumps to increase their grip on the tubes held.

Having thus described the invention, what we claim herein is:

A hose connector for use with vacuum cleaners, said hose connector comprising a cylindrical tube having an internal body portion formed of a soft squashy substance, an external portion comprising a pliable synthetic resin sheath completely encasing said soft squashy substance, the inside of said cylindrical tube being provided with a first large sized frusto-conical surface, a second frusto-conical surface of a size smaller than said first frusto-conical surface, a third frusto-conical surface of a size smaller than said second frusto-conical surface, a plurality of independent radially inwardly extending projections formed integrally with said sheath and spaced around the circumference of each of said frusto-conical surfaces, and a plurality of axially spaced external rings formed in said sheath and encircling the external side of the cylindrical tube, said soft squashy substance acting to resiliently resist radial inward movement of said projections when a male coupling member is inserted into said tube.

References Cited in the file of this patent

UNITED STATES PATENTS

| | | |
|---|---|---|
| 1,945,208 | Troy | Jan. 30, 1934 |
| 1,985,502 | Isenberg | Dec. 25, 1934 |
| 2,085,841 | Weiss | July 6, 1937 |
| 2,094,889 | Hooper | Oct. 5, 1937 |
| 2,360,734 | Smith | Oct. 17, 1944 |
| 2,688,499 | Hanson | Sept. 7, 1954 |
| 2,699,357 | Roth | Jan. 11, 1955 |
| 2,973,972 | Von Den Baumen | Mar. 7, 1961 |
| 2,978,533 | Colbert | Apr. 4, 1961 |

FOREIGN PATENTS

| | | |
|---|---|---|
| 1,119,740 | France | Apr. 9, 1956 |